US005734835A

United States Patent [19]

Selker

[11] Patent Number: 5,734,835

[45] Date of Patent: Mar. 31, 1998

[54] INEXPENSIVE WORLD WIDE WEB TERMINAL APPLIANCE USING DISK SYNCHRONIZED WITH RASTER REFRESH FOR STORAGE OF DISPLAYED PAGES

[75] Inventor: Edwin Joseph Selker, Palo Alto, Calif.

[73] Assignee: International Business Machines Corporation, Armonk, N.Y.

[21] Appl. No.: 672,285

[22] Filed: Jun. 28, 1996

[51] Int. Cl.[6] .............................. G06F 13/42; G09G 5/12

[52] U.S. Cl. ............... 395/200.79; 395/526; 395/200.47; 395/200.48; 395/200.49; 345/213; 345/189; 345/2; 348/464; 348/476; 348/569; 711/112; 360/73.03

[58] Field of Search ........... 395/200.79, 200.47–200.49, 395/509, 521, 526, 404, 401, 427, 501, 439; 345/213, 189, 2; 348/464, 443–452, 476–481, 541–548, 555–569, 911; 771/112; 360/73.03

[56] References Cited

U.S. PATENT DOCUMENTS

| | | | |
|---|---|---|---|
| 4,516,150 | 5/1985 | Gurley | 348/489 |
| 4,924,303 | 5/1990 | Brandon et al. | 348/7 |
| 4,961,071 | 10/1990 | Krooss | 345/119 |
| 5,014,125 | 5/1991 | Pocock et al. | 348/7 |
| 5,021,775 | 6/1991 | Babin | 345/213 |
| 5,285,197 | 2/1994 | Schmidt et al. | 345/213 |
| 5,299,026 | 3/1994 | Vincett et al. | 358/401 |
| 5,307,456 | 4/1994 | MacKay | 395/328 |
| 5,342,034 | 8/1994 | Mandel et al. | 270/58.08 |
| 5,375,068 | 12/1994 | Palmer et al. | 395/200.34 |
| 5,390,910 | 2/1995 | Mandel et al. | 271/296 |
| 5,410,698 | 4/1995 | Danneels et al. | 395/685 |
| 5,481,542 | 1/1996 | Logston et al. | 348/7 |
| 5,493,568 | 2/1996 | Sampat et al. | 370/261 |
| 5,499,046 | 3/1996 | Schiller et al. | 348/6 |
| 5,550,982 | 8/1996 | Long et al. | 395/200.49 |
| 5,572,643 | 11/1996 | Judson | 396/200.48 |
| 5,617,565 | 4/1997 | Augenbraum et al. | 395/604 |

OTHER PUBLICATIONS

D. I. Seidman, Multimedia Dynamic Program Director, IBM Technical Disclosure Bulletin, vol. 38, No. 12, pp. 311–312, Dec. 1995.

J. Pelline, Chronicle Staff Writer, Oracle CEO Jets Off to Push 'Magic Box', San Francisco Chronicle, newspaper, pp. B1 and B2 Col. 1, Jan. 11, 1996 (Article).

J. E. Rigdon, Staff Reporter of the Wall Street Journal, Oracle Nearing Finished Design for Internet PC, Wall Street Journal Technology Section, Th, Jan. 11, 1996 (Article).

DeRoure, Vandoni, Information Highway Applicatoins, Computing Proceedings, Arles, France, 20 Aug.–2 Sep. 1995. (In 1995 CERN School of Computing) (Abstract).

*Primary Examiner*—James P. Trammell
*Assistant Examiner*—Tuan Q. Dam
*Attorney, Agent, or Firm*—James C. Pintner

[57] ABSTRACT

A World Wide Web terminal appliance utilizes a disk drive for local storage of Web pages previously downloaded and rendered for display during the course of a Web surfing session. The disk drive rotates at a rate substantially in synchronization with a display refresh time interval of a display device, preferably a raster refresh cycle time of a video monitor. Therefore, the image being displayed need not occupy random-access memory, but rather is sent directly from the disk to a display interface for coupling to the display device. Little or no RAM buffering is required, so the appliance need not include a large quantity of video RAM storage. A relatively inexpensive disk is used instead, thereby bringing about advantageous cost savings.

16 Claims, 5 Drawing Sheets

INEXPENSIVE WORLD WIDE WEB TERMINAL APPLIANCE USING DISK SYNCHRONIZED WITH RASTER REFRESH FOR STORAGE OF DISPLAYED PAGES

FIELD OF THE INVENTION

The invention generally relates to the field of network communications, particularly communications over the Internet and the World Wide Web. More particularly, the invention is related to Web user appliances.

1. Background of the Invention

Glossary of Terms Used

While dictionary meanings are also implied by certain terms used here, the following glossary of some terms may be useful.

Internet ("the Net"): The connection system that links computers worldwide in a network.

TCP/IP: Transmission Control Protocol/Internet Protocol. A packet switching scheme the Internet uses to chop, route, and reconstruct the data it handles, from e-mail to video.

World Wide Web (WWW, "the Web"): The Internet's application that lets people seeking information on the Internet switch from server to server and database to database by clicking on highlighted words or phrases of interest. An Internet Web server supports clients and provides information.

Home page: A multi-media table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locator, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. Patents:

Bernstein et al., U.S. Pat. No. 5,204,947, issued Apr. 20, 1993;

Bernstein et al., U.S. Pat. No. 5,297,249, issued Mar. 22, 1994; and

Lewis, U.S. Pat. No. 5,355,472, issued Oct. 11, 1994;

all of which are assigned to International Business Machines Corporation, and which are referenced herein.

2. Description of the Prior Art

In recent years, the technology of multimedia storage and interactive accessing has converged with that of network communications technologies, to present exciting prospects for users who seek access to remotely stored multimedia information.

For instance, in the particular area of video data compression, storage, and interactive accessing, a video-on-demand system is disclosed in Pocock et al., U.S. Pat. No. 5,014, 125, "Television System for the Interactive Distribution of Selectable Video Presentations." In the Pocock system, a user employs a terminal in conjunction with a television. The terminal establishes a telephone network link with a central location for exchange of commands and the audio portion of a presentation. The video portion is provided separately, over a higher bandwidth medium. Interactive command functions are limited to the initial selection of programming to be viewed.

Another video-on-demand system is disclosed in Logston et al., "Interactive Information Services Control System", U.S. Pat. No. 5,481,542. In the Logston system, a user employs a set-top terminal along with a conventional television set, and accesses video data objects, such as movies, from a Service Provider over a broadband transmission network. Control functions at the set top terminal allow the user to perform functions such as rewind, fast-forward, pause, etc., in the course of real-time downloading and playback of a movie. The commands are routed through a reverse signaling path, such as Ethernet, separate from the broadband network. The combined use of these two communication media to achieve the overall goal of video on demand takes advantage of both the bandwidth of broadband networks, such as cable TV, and the user-unique switching capability of the reverse signaling path.

A design constraint common to both the Pocock and Logston systems is that high bandwidth is required for the real-time transmission of video information. Therefore, their architectures have had to provide for that bandwidth. As a consequence, these system architectures can be rather cumbersome and costly to the user. It will be seen that other types of multimedia information are more flexible as to their bandwidth requirements, and need not hold to these architectural constraints.

Meanwhile, other technical areas and communication media have captured the public imagination, particularly in recent years. Particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another.

The composite network represented by these networks relies on no single transmission medium. Bi-directional communication can occur via satellite links, fiber-optic trunk lines, phone lines, cable TV wires, and local radio links. However, no other communication medium is quite as ubiquitous or easy to access as the telephone network. The number of Web users has exploded, largely due to the convenience of accessing the Internet by coupling home computers, through modems, to the telephone network. As a consequence, many aspects of the Internet and the Web, such as network communication architectures and protocols, have evolved based around the premise that the communication medium may be one of limited bandwidth, such as the telephone network.

To this point the World Wide Web (Web) provided by the Internet has been used in industry predominately as a means of communication, advertisement, and placement of orders. The World Wide Web facilitates user access to information resources by letting the user jump from one Web page, or from one server, to another, simply by selecting a highlighted word, picture or icon (a program object representation) about which the user wants more information. The programming construct which makes this maneuver possible is known as a "hyperlink".

In order to explore the WWW today, the user loads a special navigation program, called a "Web browser" onto his computer. A browser is a program which is particularly tailored for facilitating user requests for Web pages by implementing hyperlinks in a graphical environment.

There are a number of browsers presently in existence and in use. Common examples are NetScape, Mosaic and IBM's Web Explorer. Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

A user of a Web browser who is researching a particular area of interest will often move from one home page, to another, to another, etc., by hyperlinking from each successive page to the next. The user tends to develop a mental picture of his/her pathway through the Web, based on a recollection of the pages he/she has viewed. Often, the user will want to page rapidly backward, through pages already viewed, to reach a point where more than one hyperlink of interest was located, so that he/she can explore, in succession, where those links lead.

As a consequence, a user will often view a previously viewed page, after having viewed several other pages in between. Thus, an important design objective in an Internet/Web user interface appliance is the availability of a large quantity of storage capacity, so that a previously viewed page can be read out of on-board storage, rather than being reloaded over the Internet again.

The data stored at a remote server and downloaded over the Internet to the user's local terminal is generally in a form where, for instance, text is represented merely as ASCII codes. When the data is provided to a display, it first must be "rendered." Rendering means converting the data from the form in which it is stored to a form in which it is ready to be provided to the display interface. For instance, an ASCII code representing a character is converted to an array of video pixels, in which information such as font, character and background colors, etc., are all provided. The character then is appropriately positioned within a body or rasterized video image data.

Note that non-rendered data may, but need not be, have been subjected to a data compression algorithm prior to storage at the server. Decompressing such compressed data is not necessarily a part of the rendering process.

It is well known that rendering greatly increases the volume of data for a given image. This is, of course, why the data is stored at the server in a non-rendered state.

However, at the local terminal, there is a trade-off. On the one hand, if the local terminal renders the data as it is received, and stores it in that form, the local, on-board data storage requirements are substantially increased. On the other hand, if the data is stored in non-rendered form and is rendered on-the-fly as it is read from local storage and redisplayed, the processing time required for he rendering causes a noticeable, and undesirable, delay in the display of the image.

For individuals and ordinary consumers, home computers, such as IBM Corporation's line of Personal Computers, suitably equipped with modems for telephone line interfacing and with Web browsers, have made Web access available. In general, most recent models of home computers have had enough storage capacity to store on the order of dozens of Web pages. However, home computers remain relatively expensive, and they have a great deal of other functionality which is not essential for Web interfacing.

Therefore, the industry has had a goal of producing an inexpensive Web terminal, or "Web computer", which would save cost by eliminating a lot of the nonessential features of general purpose home computers, but which would make Internet access available at a lower cost to the ordinary user than heretofore.

Recent product announcements have demonstrated the industry's interest in such a product. For instance, articles in the Wall Street Journal and the San Francisco Chronicle, both dated Jan. 11, 1996, announced Oracle Corporation's impending product release of an "Internet PC" Web terminal product, to be priced at around $500. New products, commercially priced in this range, could potentially reach a new and large segment of the consumer electronics buying population, and make Web access available to this previously unserved segment.

It is, of course, granted that most such low-priced apparatus would save cost by sacrificing may of the components and features that a full-service personal computer would offer. The challenge to the system designer is to determine which components can be sacrificed, while still preserving the essential functionality. Therefore, the technical field and the commercial market are ripe with possibilities for new, creative ideas for apparatus and techniques which further reduce the cost of Internet access.

SUMMARY OF THE INVENTION

It is therefore an object of the invention to provide a Web interface appliance which is inexpensive enough to be within the means of large numbers of Web users, such as ordinary consumers.

It is a further objective of the invention to provide a Web appliance which provides cost savings particularly in regard to a Web appliance's storage requirement.

It is a further objective of the invention to provide an advantageous solution to the above-described storage-of-rendered-data versus rendering-on-the-fly-at-display-time conundrum.

To achieve these and other objectives, there is provided in accordance with the invention a Web appliance, for interfacing with the Internet and a suitable display such as a television of a computer video monitor, and running a Web browser program which supports a suitable user interface for entering Web surfing commands. In accordance with the invention, the Web appliance includes a storage device having a volume sufficient to store a large number of rendered images.

Preferably, the storage device is relatively inexpensive, on a per-unit-of-data basis. At the present time, the known and available source of mass storage which best fulfills this objective is a hard disk.

Also in accordance with the invention, the storage device has a periodic time parameter related to data access, preferably a disk spinning at a specified number of revolutions per second. It is further preferable that the time parameter is related to a time parameter of the display.

For example, a preferred Web appliance according to the invention is used with a raster-type video display having the typical raster refresh period of 1/30 second, wherein every second raster line is refreshed during a 1/60 second period, and the interleaved raster lines are refreshed during the next 1/60 second. Accordingly, a 60 rotations-per-second (rps) disk allows for access of a data image (e.g., a Web page) stored with successive portions of the image in successive sectors of a track, in just the synchronization necessary to provide the image data from the disk as the raster is ready to receive it.

Such a system is advantageously simple and inexpensive, since there is no need for a large quantity of video image buffer and storage memory, and since disk storage is cheaper than conventional video RAM storage. Short term buffering and management may be dispensed with, except possible for a small quantity, on the order of one raster line's worth, for short term buffering between the reading of data from a single sector and the display of the data on a corresponding single raster line.

Accordingly, substantial cost savings may be realized in the overall implementation of the appliance according to the invention. Specifically, while a conventional Web terminal device might have on the order of 8–16 megabytes of RAM, primarily for image buffering and storage, an appliance according to the invention replaces that RAM with an inexpensive disk, thereby enhancing the appliance's attractiveness on the market.

DESCRIPTION OF THE PREFERRED EMBODIMENT

Figure 1:
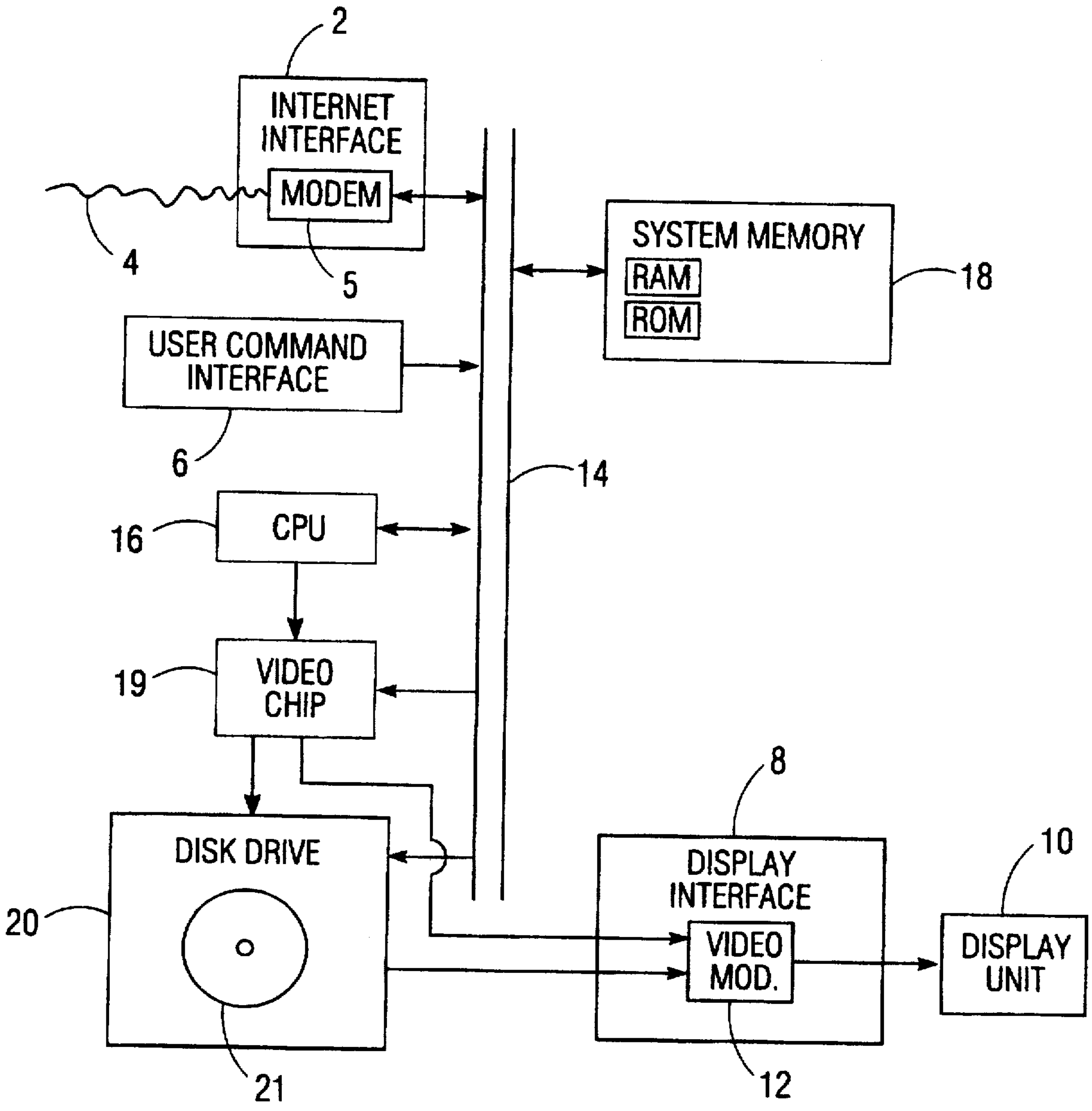
FIG. 1 is a system block diagram showing one possible architecture for a Web terminal appliance according to the invention.

Initially, a general description of a system according to the invention will be given, with reference to an exemplary architecture shown in FIG. 1.

A Web terminal appliance employs three interfaces. First, an Internet interface 2 is coupled to a network medium 4, such as the telephone network. The interface 2 preferably includes a modem 5. Second, a user command interface 6 allow the user to enter commands such as mouse clicks on hyperlinks, or to enter text. Therefore, the user interface 6 typically includes a keyboard and a mouse. Third, a display interface 8 is provided for coupling with a display device 10. Where the display interface 8 is to be coupled with a video display, the display interface 8 typically includes a video modulator 12.

The interior architecture of the device may vary to a considerable degree, within the spirit and scope of the invention, as would be understood by skilled electronic and computer system designers. One possible interior architecture is given in FIG. 1.

In FIG. 1, a system bus 14 is provided for coupling with most other system compoments, such as the interfaces 2 and 6 previously discussed. The system further includes a central processing unit (CPU) 16 for performing all functions related to the operation of the system. System program code, such as a Web browser and code for performing various conventional programming overhead tasks, may be provided for the CPU 16 in system memory 18, such as in system read-only memory (ROM) included within the system memory 18. Also, for routine needs such as scratchpad registers, temporary memory, etc., as would be understood by skilled programmers, the system memory 18 may further include random access memory (RAM).

Note, however, that, in accordance with the invention, any RAM included within the system memory 18 need not be great enough in quantity to serve as video RAM for storage of images which either are being currently displayed or were previously displayed. Rather, in accordance with the invention, storage for video images such as Web pages is provided by means of a disk drive 20 including a disk 21.

Note also that image data received through the Internet interface 2 and handled over the bus 14 is in a non-rendered form. That is, rather than being in the rasterized for ready for display, the data is in a form, well-known to those in the video display arts, which allows for storage in a reduced volume of memory. For instance, any text which makes up part of the image is merely in the form of ASCII codes.

Further in accordance with the invention, the image data is rendered prior to being placed into the disk drive 20. The process of rendering is well-known, so details will be omitted, except to say, as an example, that the ASCII codes representing text are rendered by converting them to arrays of pixel elements, including fonts, character and background colors, etc., and arranging the arrays of pixels into lines of text images as they are to appear on the display.

Rendering is computationally intensive, so it may be performed either by the CPU 16 or, as shown, by a separate video chip 19. Such video chips are well-known, and are commercially available.

As shown in FIG. 1, any rendered data is handled separately from the bus 14, although other architectures, for which the opposite is true, are also feasible. Non-rendered data is directed by the CPU 16 to the video chip 19. The video chip 19 renders that data, and sends the rendered data to the disk drive 20. As shown, the video chip 19 and the disk controller of the disk drive 20 both operate responsive to commands given from the CPU over the bus 14.

In operation responsive to receipt of a Web page downloaded over the Internet and received at the Internet interface 2, the CPU 16 directs the rendered page from the video chip 19 to the display interface 8 for display, and also to a vacant portion of the storage disk 21 supported by the disk drive 20.

In accordance with the invention, the data is stored on the disk 21 in a manner which facilitates reading the data and sending it directly to the display interface. As a consequence, redisplaying a previously viewed and stored Web page may be accomplished without requiring a large quantity of expensive video RAM. Preferably, where the display device has a display cycle time or refresh time, such as that associated with raster-type video displays, the data is stored on the disk 21 so as to be accessible in sequence over a display cycle period, so that the data is read from the disk 21 just as it is needed for the display device 10.

This objective is preferably realized by having the rotational period of the drive 20 be equal to the standard raster screen refresh period of 1/30second, or 1/60second for each one of the two sets of alternating, interleaved raster lines. Other preferred realizations of the invention are simple integral ratios between the display cycle time and the rotational period of the disk 21.

Note that these preferred ratios do not place a practical burden on the type of disk drive used. Rather, the invention advantageously allows for use of inexpensive, non-state-of-the-art disk drives.

One possible embodiment of the invention will now be given as an example, with reference to FIGS. 2, 3, and 4.

Figure 2:
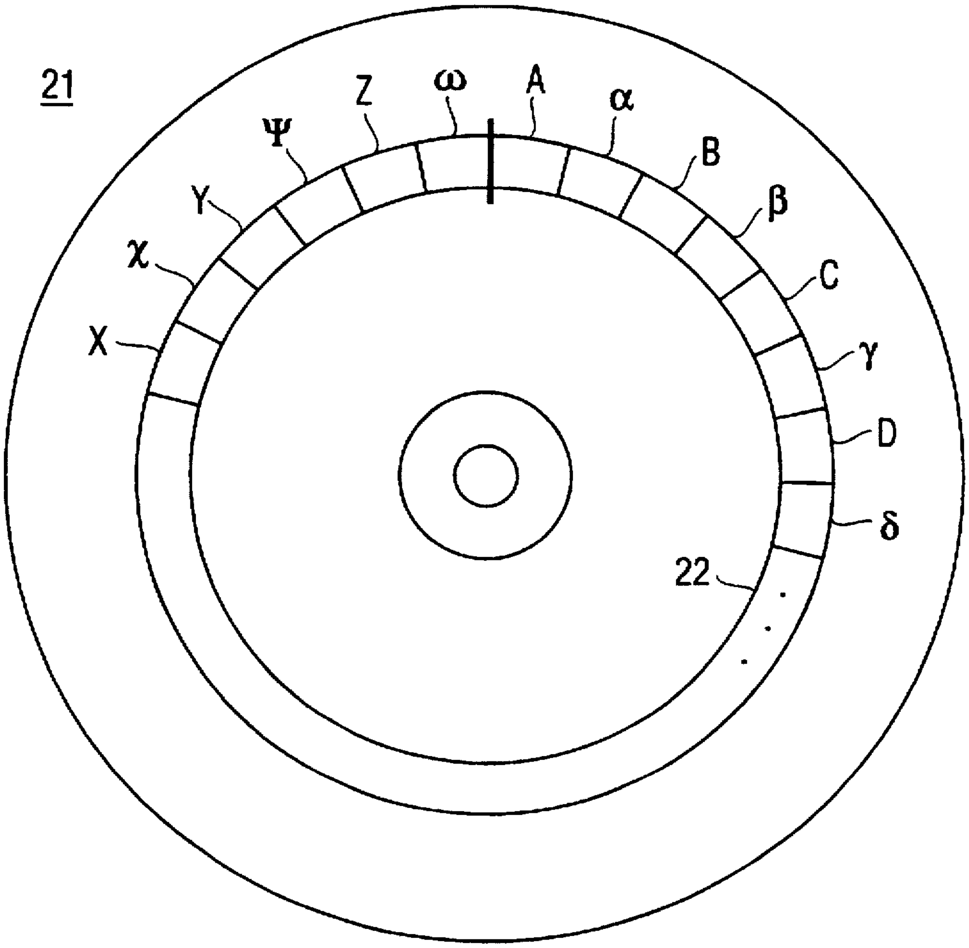
FIG. 2 is a schematic representation of data for a displayed Web page stored in various sectors of a track of a disk in the system of FIG. 1.

FIG. 2 is a schematic representation of a disk 21 supported by the disk drive 20, showing a track 22 which runs, at a given radius, around the disk 21. Preferably, different Web pages are stored on different tracks of the disk 21. The data represented in FIG. 2, therefore, pertains to one particular Web page. Different sectors of the disk 21 bear different portions of the Web page. The sectors are labeled with either upper-case Roman letters (A, B, C, D, etc.) or lowercase Greek letters (α,β,γ,δ, etc.). The reason for this naming convention will be come clear as the discussion of this example continues.

Figure 3:
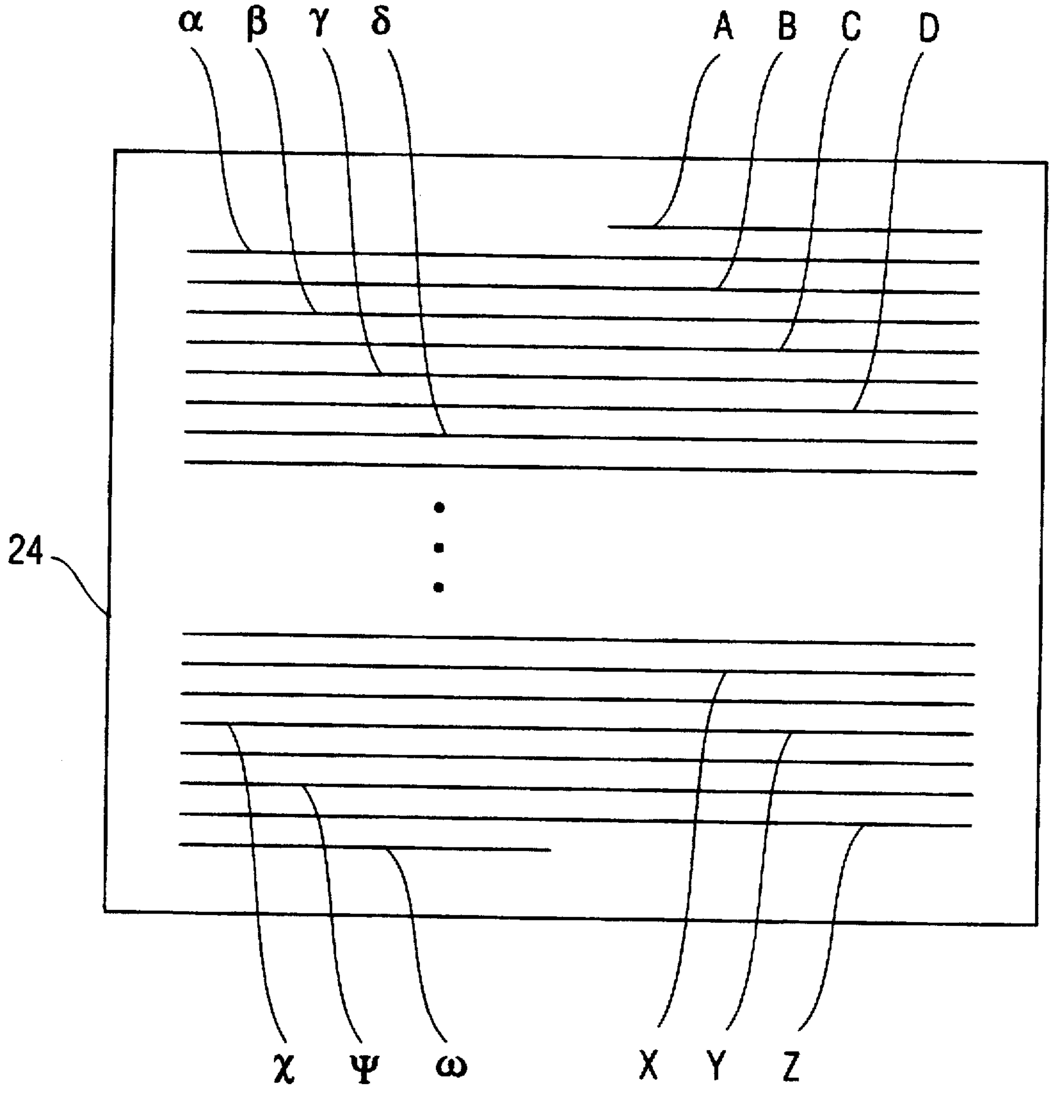
FIG. 3 is a diagram of a raster-type display device showing how the data on the disk of FIG. 2 is to be displayed.

Referring now to FIG. 3, there is shown a video display 24, having a series of horizontal lines which represent individual video raster lines. It is well known that an image on a raster-type video display is displayed, or refreshed, by sweeping a signal-modulated electron beam horizontally across the display, one raster line at a time. It is also known that a screen refresh does every other one of the raster lines, from top to bottom, and then goes back and does the raster lines that were omitted.

Accordingly, a screen refresh cycle will refresh, in sequence, the raster lines labeled A, B, C, D, . . . , X, Y, and Z, in that sequence, omitting the Greek-letter-labeled lines. Then the Greek-letter raster lines α,β,γ,δ. . . , χ,ψ,ω are refreshed, this time omitting the Roman-letter lines.

With the raster screen refresh cycle described above in mind, it will then be seen that the data of FIG. 3 is disposed at the various sectors of the track 22 to allow for reading during the same time interval as a screen refresh is taking place. That is, the disk 21 rotates at 60 revolutions per second, so that it will have gone through a full rotation during the time that half of the raster lines are refreshed.

During a first revolution, the alternating, Roman-letter-labeled sectors are read. As each sector is read, the data is directed from the disk drive 20, through the system bus 14, to the display interface 8, for modulation by the video modulator 12, and immediate display on the display device 10. Thus, the data being read never needs to be stored in any significantly large quantity of video RAM.

During the next revolution, the Greek-letter-labeled sectors are read and displayed in the same fashion.

Figure 4:
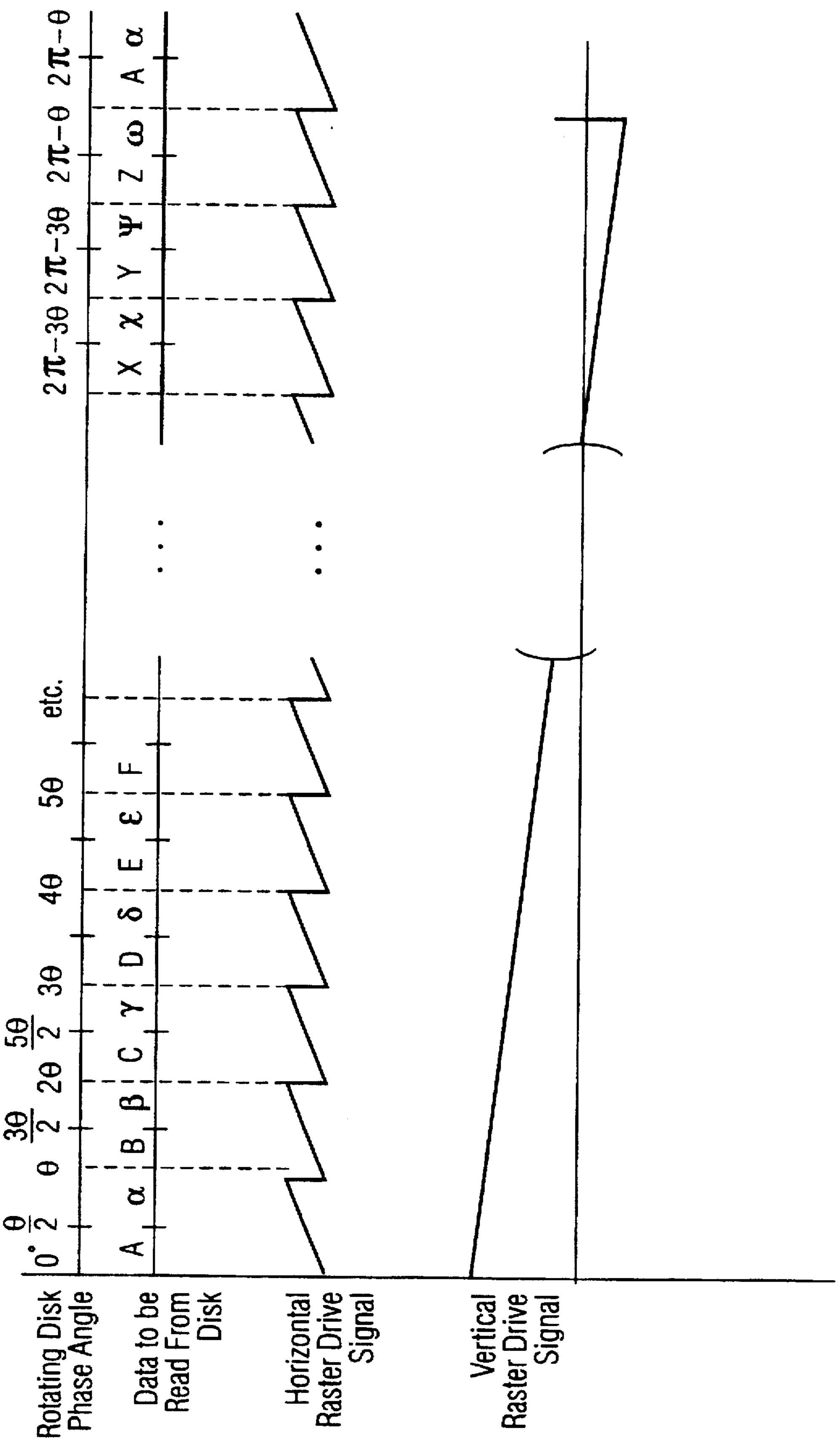
FIG. 4 is a timing diagram showing horizontal and vertical raster drive signals for the display of FIG. 3, and the corresponding times at which a system according to the invention reads the data from the disk of FIG. 2.

Referring now to FIG. 4, there is shown a timing diagram further illustrating the operation of the exemplary embodiment of the invention.

A first line provides a graduated scale, in terms of rotation of the disk 21, expressed in radians and in terms of an arbitrary unit rotational phase angle θ. As the disk 21 rotates an angle θ, the read head (presumed to be in a stationary position over the surface of the disk 21) traverses a sector containing a piece of Roman-letter-labeled data and a piece of Greek-letter-labeled data.

The second line of the timing diagram labels which sector of the disk 21 is being traversed during that time interval. The intervals are thus labeled with either Greek or Roman letters.

The third and fourth lines are sawtooth-shaped raster drive signals for displacing an electron beam from a video electron gun, in the horizontal and vertical directions, over the interior surface of a video picture tube. As is well-known in the video and television arts, the period of the horizontal sweep signal is less than that of the vertical signal by a factor of half the number of raster lines in the video display.

Over one period of the vertical sweep signal, the disk 21 makes one complete revolution. Over each period of the horizontal sweep signal, the read head traverses one Roman track and one Greek track. For this particular screen refresh, only one of those is actually needed. The one which is needed is read from the disk 21, and provided from the disk drive 20, over the bus 14, to the video interface 8, essentially as it is read.

It will, of course, be recognized that an accurate rendering of the image on the display 10 requires that the data for that raster line be evenly dispersed over the entire period of the horizontal sweep signal's sawtooth. To the extent that the reading of a given byte of the data from the disk 21 is not precisely in synchronization with this requirement of the video display, buffering, in a quantity which does not need to exceed one raster line's worth, may be provided.

Figure 5:
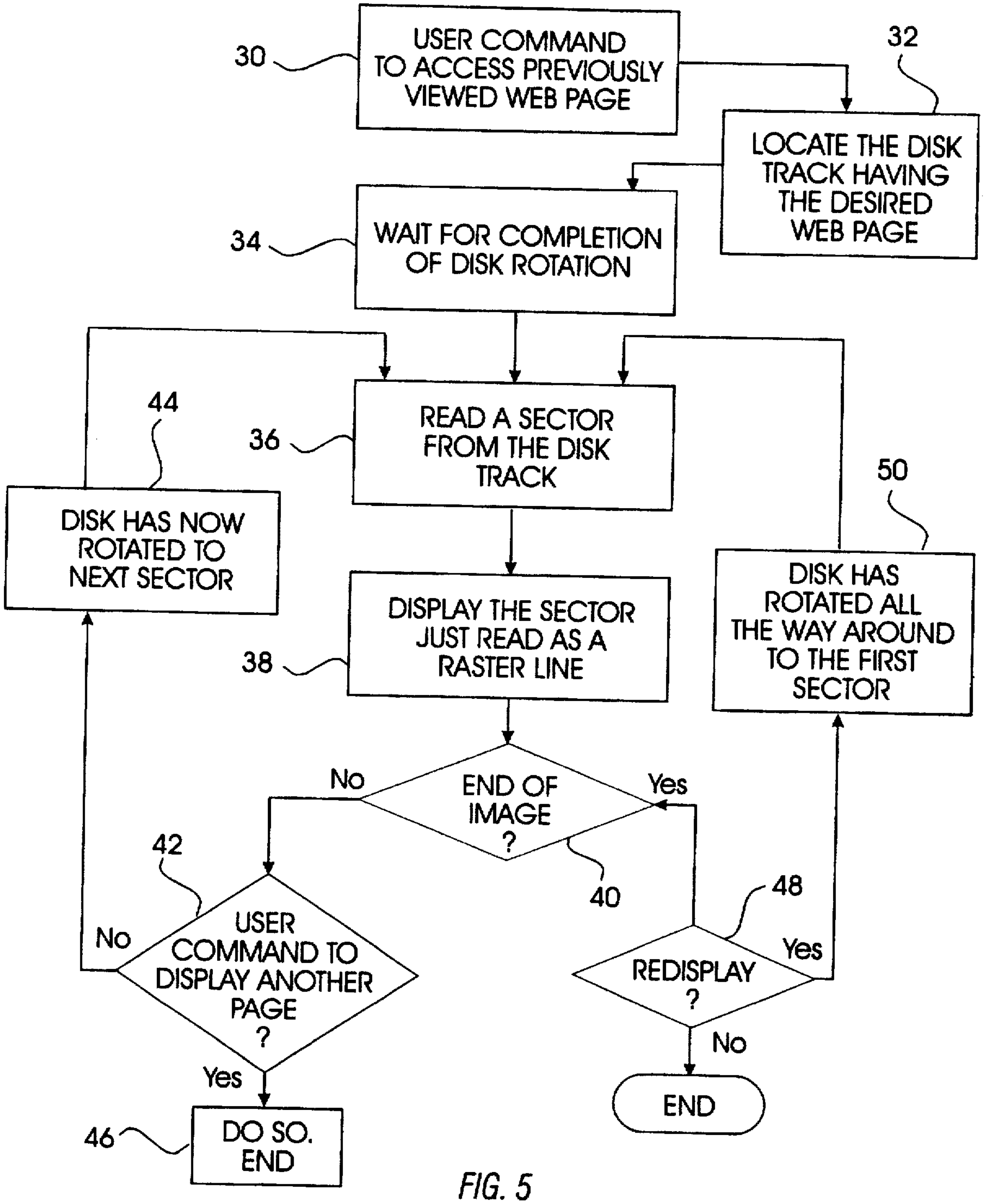
FIG. 5 is a flowchart describing operation of a system according to the invention.

Referring now to FIG. 5, the operation of the system according to the invention will be given in flowchart form.

In response to a user command 30 for access to a previously viewed Web page, the system initially locates the track the data is stored on, and positions the read head at that track (step 32). If necessary, the system waits for the disk 21 to complete a revolution (step 34).

The system then begins a loop operation. A sector is read from the track (step 36). For the sake of the present discussion, the particular arrangement of the data on the disk 21, such as that of the alternating Roman- and Greek-letter-labeled sectors will be disregarded, although it is understood that this issue will have been dealt with appropriately for the particular embodiment used.

Then, the data is provided to the display interface 8 for display on the display device 10 (step 38).

The processing which follows step 38 will be subject to such modifications as other embodiments may require. In this embodiment, a test is made to see if the system has reached the end of the image, i.e., the last raster line (step 40). If not, the system tests for whether the user as asked to see another page (step 42). If not, the next iteration of the loop is executed. It is noted that the disk 21 has rotated to the next sector (step 44). The system waits for the rotation, if necessary. Then, step 36 is repeated for the next sector.

If the user has asked for another page (step 46), the system responds appropriately, in processing that is beyond the scope of this disclosure.

If, on the other hand, step 40 determines that the end of the image has been reached, then, depending on the particular type of system architecture, a refresh of the same image, by rereading the data from the disk 21, may be required. Step 48 may thus be regarded not as a processing step, but rather as a contingency based on the particular system architecture. If a refresh is needed, then it is noted that the disk 21 has completed a revolution (step 50), and step 36 is re-executed, going back to the beginning of the image.

Note that this arrangement is advantageous for initial storage of the image data on the disk 21, because the data is downloaded over the Internet without regard to rasterized line interleaving. Accordingly, if the data is received in a top-to-bottom fashion, then it can be written onto the disk 21 in the same fashion, to appear as shown.

Various alternative disk storage arrangements may easily be visualized, given this basic example. For instance, the Roman-letter-labeled data might be stored on a separate track from the Greek-letter labeled data. If the data is downloaded in something other than a top-to-bottom fashion, then a suitable data handling process is made for rearranging the data for storage.

Also, while the present example shows a preferred data storage arrangement for a disk rotating at the same rate as the screen refresh. These rates need not be the same, as long as a suitable arrangement is made for keeping track of which sector of which track which part of the Web page image data is kept.

A few simple variants would be to have the disk 21 running half as fast, or twice as fast. In the former case, a single revolution, rather than two revolutions, would correspond with one refresh of all of the raster lines. In that case, the data is preferably arranged to that all of the Roman-letter-labeled data is contiguous, over 180° of the track, and the Greek-letter-labeled data is contiguous, over the other 180° of the track.

Disk systems also use other commonly-occurring revolution rates, such as 5200 or 7400 RPM. Also, different display systems use different refresh times, and there may or may not be interleaving of the raster lines. Suitable combinations of revolution rates and raster refresh arrangements may be used with each other in accordance with the invention.

In general, it is considered preferable to have a simple, integral ratio between the disk's revolution rate and the display refresh cycle time. Such a simple ratio is reflected in the physical arrangement of the sectors on the disk in which the data is actually stored. For instance, it is desirable to store an entire image within sectors of a single track, because access to the stored image can then be accomplished without moving the read head between different tracks. If an image can be stored in its entirety in, for instance, one-half or one-third of the perimeter of a given track, then it may be convenient or efficient to pack two or three images within different ranges of sectors around the perimeter of a single track. The basic criterion is ease of storage and access.

The invention is more broadly applicable, however, where there are merely certain bounds on the disk speed. For instance, if a display has a refresh cycle time A, a disk revolution period B may allow for storage of an image around the full perimeter of one track, then any disk revolution period slightly smaller than B (i.e., the disk spinning slightly faster) permits the image to be stored on one track, around slightly less than the full perimeter of the disk. Any such arrangement will preserve the ability of the system to refresh the image from data straight out of the disk, requiring little or no buffering.

It is preferable to store, in addition to the Web page itself, any suitable border information that the Web browser in use produces, such as a graphical user interface (GUI) window, etc. If this information is kept in the same track as the Web page, then the border information is right where it needs to be to complete the display image. Alternatively, it will be necessary to add the border information on-the-fly, as the Web page is being read from the disk 21 for display on the display device 10.

While the Web browser and associated system software may be stored in the ROM portion of the system memory 18, it may alternatively be stored on either a different disk, included as a further component of the system otherwise shown in FIG. 1, or on the same disk 21 used for storage of Web pages.

Meta-information about links, font, color, etc., may be stored in the horizontal retrace of the video for horizontal retrace time of the video monitor. JAVA code, written in Sun Microsystems' JAVA programming language by the user or by a software vendor for the user's use for performing suitable tasks, may be stored in the vertical retrace time of the frame, or on a separate disk or memory. Suitable permutations of these concrete examples, which would suggest themselves to a skilled artisan, may also be practiced, in accordance with the spirit and scope of the invention.

Finally, it should be noted that, in the future, semiconductor memory prices may drastically decrease, or other, more exotic, forms of storage such as holographic storage may become price competitive with disk storage as used in the above-discussed embodiments of the invention. Since an important objective of the invention is to avoid rendering locally stored data at display time, such other types of memory or mass storage may be used in place of the disk drive 20. Depending on the nature of these other types of storage, there may or may not be timing criteria comparable to the synchronization of the disk rotation and the display refresh cycle. However, to the extent that such synchronization is still an issue, the advantageous reduction or elimination of buffering between the storage medium and the display may still be realized.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A terminal appliance for receiving and displaying information in page form from a network, the appliance comprising:

a communication interface for coupling to the network to receive the information therefrom;

a display interface for coupling to a display device having a predetermined display image refresh time interval;

means for rendering information received through the communication interface;

a disk storage device for storing rendered pages of information received through the communication interface and rendered by the means for rendering, the disk storage device having a period of revolution substantially synchronized with the predetermined display image refresh time interval; and means for reading a rendered page of information in synchronization with the period of revolution of the disk storage device, and for directly providing the page of information to the display interface for display on the display device in synchronization with the display device's predetermined display image refresh time interval.

2. A terminal appliance as recited in claim 1, wherein:

the network includes the Internet;

the information in page form includes a World Wide Web page; and the communication interface includes an Internet interface.

3. A terminal appliance as recited in claim 1, wherein:

the display device includes a video monitor having a raster display, the raster display being refreshed according to a raster refresh time interval; and the display interface includes a video interface.

4. A terminal appliance as recited in claim 1, wherein:

the storage device includes a disk drive including a disk and having an access period for data stored thereon, the access period being related to a rotational speed of the disk;

the information in page form includes a World Wide Web page, which includes Web page information and border information; and the appliance includes means for storing Web pages on tracks of the disk drive, each Web page on a respective separate track.

5. A terminal appliance as recited in claim 1, further comprising means for storing a Web browser program, meta-information about links, fonts, or colors, or JAVA program code.

6. A terminal appliance as recited in claim 5, wherein:

the terminal appliance further comprises a read-only memory (ROM); and the means for storing includes means for storing in the ROM.

7. A terminal appliance as recited in claim 5, wherein:

the terminal appliance further comprises a second storage device including a disk; and the means for storing includes means for storing on the disk of the second storage device.

8. A terminal appliance as recited in claim 5, wherein the means for storing includes means for storing in the storage device.

9. A method for receiving and displaying information in page form from a network and for storing he information on a disk storage device having period of revolution, the method comprising the steps of:

coupling to the network to receive the information therefrom;

coupling to a display device having a predetermined display image refresh time interval which is substantially synchronized with the period of revolution of the disk storage device;

rendering information received from the network;

storing received and rendered pages of information in the disk storage device; and reading a rendered page of information in synchronization with the period of revolution of the disk storage device, and directly providing the page of information to the display device in synchronization with the display device's predetermined display image refresh time interval.

10. A method as recited in claim 9, wherein:

the network includes the Internet;

the information in page form includes a World Wide Web page; and step of coupling to the network includes coupling to an Internet interface.

11. A method as recited in claim 9, wherein the step of coupling to the display device includes coupling to a video monitor having a raster display, the raster display being refreshed according to a raster refresh time interval.

12. A method as recited in claim 9, wherein:

the step of storing includes storing in a disk drive including a disk and having an access period for data stored thereon, the access period being related to a rotational speed of the disk;

the information in page form includes a World Wide Web page, which includes Web page information and border information; and the method further includes the step of storing Web pages on tracks of the disk drive, each Web page on a respective separate track.

13. A method as recited in claim 9, further comprising the step of storing a Web browser program, meta-information about links, fonts, or colors, or JAVA program code.

14. A method as recited in claim 13 wherein the step of storing includes storing in a Read-Only Memory (ROM).

15. A method as recited in claim 13 wherein the step of storing includes storing on a disk of a second storage device.

16. A terminal appliance as recited in claim 13, wherein the step of storing includes storing in the storage device.

* * * * *